May 27, 1958     J. E. HALL, SR     2,836,446
STOP COLLAR

Filed June 9, 1954                                                           2 Sheets-Sheet 1

INVENTOR.
Jesse E. Hall, Sr
BY Thos. E. Scofield
ATTORNEY.

May 27, 1958  J. E. HALL, SR  2,836,446
STOP COLLAR
Filed June 9, 1954  2 Sheets-Sheet 2

INVENTOR.
Jesse E. Hall, Sr.
BY
ATTORNEY.

United States Patent Office 2,836,446
Patented May 27, 1958

2,836,446

STOP COLLAR

Jesse E. Hall, Sr., Weatherford, Tex.

Application June 9, 1954, Serial No. 435,436

1 Claim. (Cl. 287—52)

This invention relates to improvements in stop collars for applying oil well tools to the exterior of casing or pipe, and refers more particularly to a stop collar construction which may be fixedly attached to oil well casing, tubing, or pipe for the purpose of locating and holding in a predetermined and desired position tools to be mounted on the exterior of the pipe or casing.

Where it is necessary to mount tools useful in the drilling, completion, cementing or producing of oil wells on the casing, pipe or tubing run into the well, it has been conventional practice to employ frictional attachment of one sort or another, attachment by welding, or the welding of stops or lugs above and below the tools to position the tools along the pipe or casing at desired locations. The instant invention provides a stop collar designed to avoid the necessity of welding operations heretofore used and at the same time offers a construction which is positive and sufficiently rugged to withstand the abuse to which it is subjected with little likelihood of failure.

An object, therefore, of the invention is to provide a stop collar construction which is useful to mount oil tools such as scratchers and centralizers on oil well casing or pipe and avoid the necessity of welding the tools to the pipe or welding lugs or stops to the pipe in order to mount the tools.

Another object of the invention is to provide a stop collar construction adapted to be rigidly attached to the casing, pipe or tubing by the simple operation of inserting wedge pins between the collar and casing or pipe.

A further object is to provide a stop collar utilizing wedge pins for its attachment to the casing or pipe, the collar itself serving as a protective cover or armored enclosure over the holding pins.

Other objects and advantages will become apparent from the description and explanation which follows.

In the accompanying drawings which form a part of the instant specification and are to be read in conjunction therewith there are shown embodiments of the invention in which like reference numerals indicate like parts in the various views.

Figure 1:
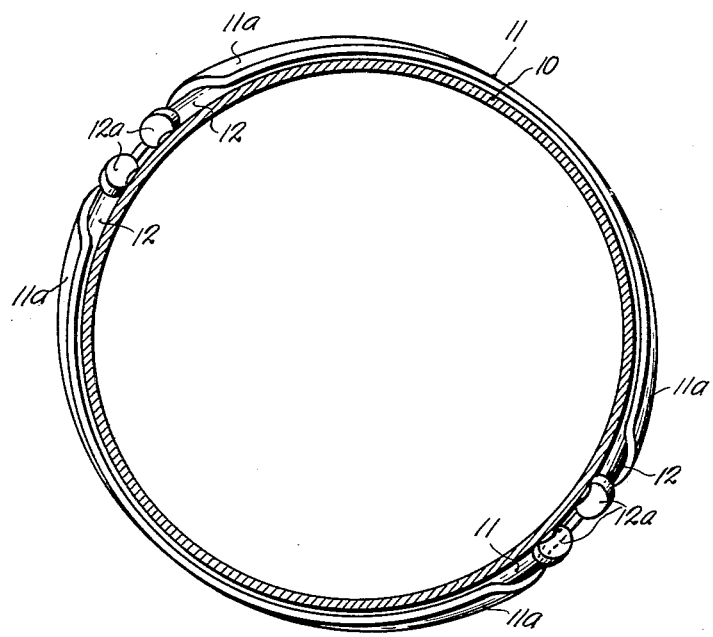
Fig. 1 is a plan view of a stop collar employing diagonally inserted wedge pins.
Figure 3:
Fig. 3 is a detail of one of the wedge pins shown in Figs. 1 and 2.
Figure 4:
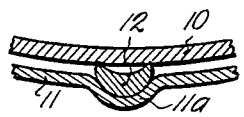
Fig. 4 is a view taken along the line 4—4 in Fig. 2, in the direction of the arrows.
Figure 5:
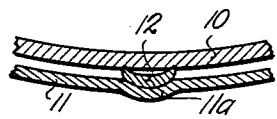
Fig. 5 is a view taken along the line 5—5 in Fig. 2, in the direction of the arrows.
Figure 2:
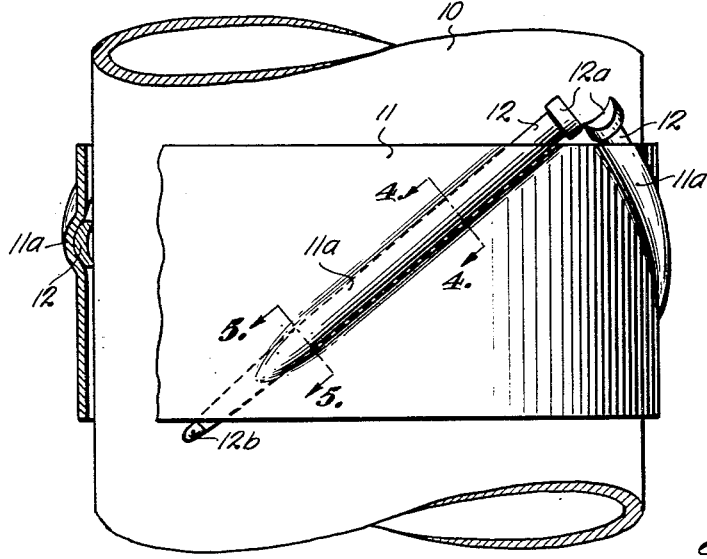
Fig. 2 is an elevational view of the device shown in Fig. 1 with parts in section.

Referring to the drawings, and particularly to Figs. 1 to 5 inclusive, at 10 is shown a casing or pipe upon which the stop collar 11 is to be mounted. Formed in the collar 11 and disposed diagonally thereof are grooves or passageways 11a which extend from the upper rim to approximately the lower rim. These passageways or internal groves are arranged in pairs, the upper extremities of each pair of passageways located substantially 180° apart and each of the passageways of the pairs extending circumorbitally of the collar and pipe in opposite directions so that two of the wedge pins 12 of each of the pairs of wedge pins are inserted into the passageways will extend in the same direction, and the other two wedge pins of the respective pairs inserted in the opposed passageway likewise extend in the same direction around the casing or pipe. The wedge pins preferably have enlarged heads shown at 12a which abut the upper rim of the collar and limit the extent to which they are insertable in the grooves 11a. The pointed or tail ends of the wedge pins are notched as shown at 12b to hook onto the lower rim of the collar when the pins have been driven home in their grooves, thus preventing displacement of the pins or their working loose in the collar. The wedge pins are preferably crescent shape in cross section and are inserted in the grooves so the rounded surfaces of the pins conform with the inner contour of the grooves, while the sharp edges bite into the exterior surface or periphery of the pipe as shown in Figs. 2, 4 and 5. Since the grooves have a tapered depth to conform with the taper of the pins and since the pins have a driving fit in the grooves, when the pins have been advanced so notches 12b are engaged with the lower rim of the collar, the sharp edges of the pins uniformly grip the exterior of the pipe.

Figure 6:
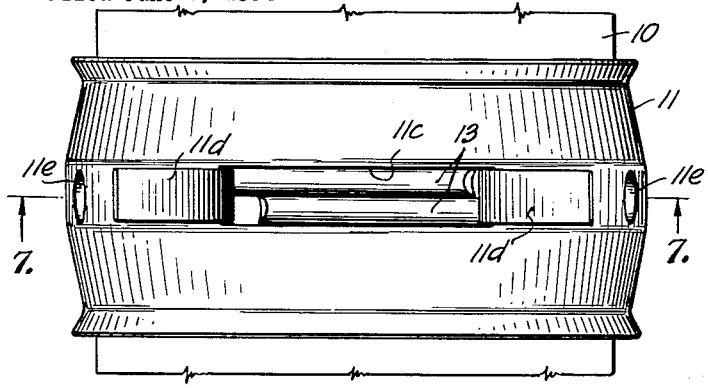
Fig. 6 is an elevational view of a modified construction.
Figure 8:
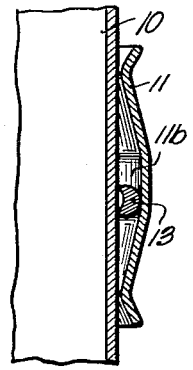
Fig. 8 is a vertical section taken along the line 8—8 in Fig. 7.
Figure 7:
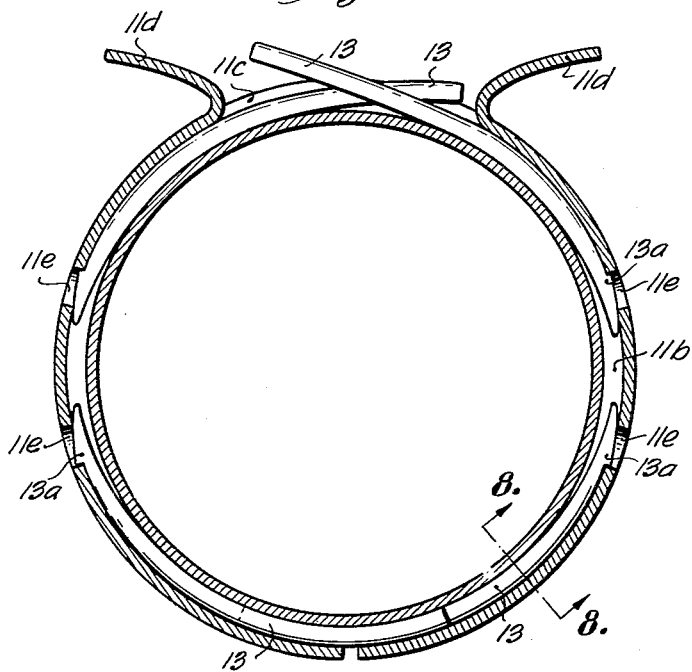
Fig. 7 is a horizontal sectional view taken along the line 7—7 in Fig. 6.

In the modified construction shown in Figs. 6 to 8 inclusive, in place of the diagonal grooves formed in the collar the medial section of the collar is arched as shown at 11b to form a single circumferentially extending passageway in the collar, shown best in Figs. 6, 7 and 8. In this arched passageway are punched out slotted apertures 11c. The punched out sections of the collar which form the apertures are turned back in the form of tabs or tongues 11d The wedge pins 13 used in the modified type of collar shown in Figs. 6, 7 and 8 may be of crescent shape in cross section with notched or hooked ends 13a, as shown in Fig. 8, or circular in cross section with fluted exterior, as shown at 14 in Figs. 9 and 10. Smaller holes or apertures 11e are punched out of the collar to facilitate locating the ends of the pins and as locking means for the pins by engagement with notches 13a.

To mount the stop collar shown in Figs. 1 and 2 on a casing or pipe with the wedge pins 12 removed, the collar is slipped along the pipe to the desired position. Wedge pins 12 are then inserted in the grooves 11a and are driven home by means of a hammer until the hooks or notches 12b engage the lower rim of the collar, at which time the edges of the pins bite into the exterior of the pipe 10 and hold the collar rigidly in place. In this fashion the collar may be located at any position and is immovably fixed on the pipe at any desired location.

Figure 9:
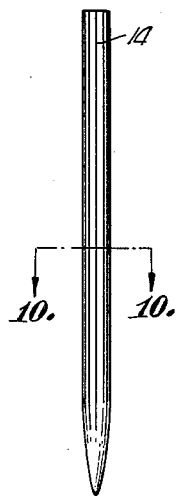
Fig. 9 is a detail of a modified type of wedge pin.
Figure 10:
Fig. 10 is a sectional view taken along the line 10—10 in Fig. 9.

To mount the modified type collar shown in Figs. 6, 7 and 8, tongues or tabs 11d are bent back to the position shown in the upper half of Fig. 7. Wedge pins 13 are then inserted from opposite directions and driven home into the passageway or tunnel 11b formed in the medial section until the notched ends 13a of the pins 13 engage the edges of locking apertures 11e, as shown in Fig. 7. When the pins have been driven to the positions shown in the upper half of Fig. 7, the head ends are bent down against the pipe and tabs 11d closed as shown in the lower half of Fig. 7 to present a smooth circular surface about the entire exterior of the collar. In this type construction as before the sharp edges of the wedge pins groove the exterior of the pipe due to the fact that the passageway 11b is of somewhat lesser height than the thickness of the pins and the driving fit between the interior surface of the passageway and the wedge pins cause the sharp edges of the pins to groove and firmly grip the smooth exterior of the pipe or casing.

Where wedge pins such as those shown in Fig. 9 of circular cross section with longitudinal fluting are used, the action of the pins is comparable to that of the pins which are crescent shape in cross section.

From the foregoing, it will be seen that there has been provided stop collars of relatively simple rugged construction adapted to be rigidly attached to pipes. The wedging elements besides assuring fixed attachment of the collar to the pipe are locked against displacement and protected from abrasive wear by the collar itself.

As many possible embodiments may be made of the invention without departing from the scope thereof, it is to be understood that all matter herein set forth or shown in the drawings is to be interpreted as illustrative and not in a limiting sense.

Having thus described my invention, I claim:

Apparatus of the character described, comprising a well casing or pipe having a smooth cylindrical exterior, a generally cylindrical collar encircling said casing intermediate its ends, the bore of said collar containing a plurality of separate grooves, each extending part way around said casing along a path oriented spirally relative to the axis thereof, said paths having a left-hand spiral pitch in the case of some of said grooves and a right-hand spiral pitch in the case of the remainder of said grooves, and a plurality of spirally oriented wedge pins, each received in one of said grooves with a longitudinal portion of the pin bearing tightly against the exterior of the casing.

References Cited in the file of this patent

UNITED STATES PATENTS

| | | |
|---|---|---|
| 545,066 | Fregeau | Aug. 27, 1895 |
| 650,154 | Owens | May 22, 1900 |
| 709,510 | Post | Sept. 23, 1902 |
| 1,740,308 | Kraber | Dec. 17, 1929 |
| 2,013,660 | Lauer | Sept. 10, 1935 |
| 2,397,585 | Anderson | Apr. 2, 1946 |
| 2,597,482 | Harrison et al. | May 20, 1952 |
| 2,645,513 | Sterrett | July 14, 1953 |
| 2,717,789 | Taylor | Sept. 13, 1955 |

FOREIGN PATENTS

| | | |
|---|---|---|
| 115,529 | Australia | July 14, 1942 |
| 4,685 | Great Britain | Mar. 5, 1901 |
| 969,217 | France | May 17, 1950 |